(12) United States Patent
New et al.

(10) Patent No.: US 11,062,101 B2
(45) Date of Patent: Jul. 13, 2021

(54) OPTICAL PROCESSING SYSTEMS

(71) Applicant: Optalysys Limited, Castleford (GB)

(72) Inventors: Nicholas James New, Castleford (GB); Robert James Todd, Castleford (GB)

(73) Assignee: Optalysys Limited, Castleford (GB)

( * ) Notice: Subject to any disclaimer, the term of this patent is extended or adjusted under 35 U.S.C. 154(b) by 0 days.

(21) Appl. No.: 16/494,765

(22) PCT Filed: Apr. 16, 2018

(86) PCT No.: PCT/EP2018/056765
§ 371 (c)(1),
(2) Date: Sep. 16, 2019

(87) PCT Pub. No.: WO2018/167316
PCT Pub. Date: Sep. 20, 2018

(65) Prior Publication Data
US 2020/0097691 A1  Mar. 26, 2020

(30) Foreign Application Priority Data
Mar. 17, 2017  (GB) .................... 1704319

(51) Int. Cl.
*G06K 7/10* (2006.01)
*G06K 7/14* (2006.01)
*H04N 5/247* (2006.01)

(52) U.S. Cl.
CPC ....... *G06K 7/10722* (2013.01); *G06K 7/1417* (2013.01); *H04N 5/247* (2013.01)

(58) Field of Classification Search
CPC .... G02B 26/06; G02B 27/106; G02B 27/144; G06E 3/003; G06K 7/10722; G06K 7/1417; G06K 9/741; H04N 5/247
See application file for complete search history.

(56) References Cited

U.S. PATENT DOCUMENTS 5,175,775 A    12/1992  Iwaki et al.
2010/0014134 A1*  1/2010  Cable ................... G03H 1/2205
                                                           359/9

(Continued)

FOREIGN PATENT DOCUMENTS

EP    0516106 A2   12/1992
EP    1004954 A1   5/2000
(Continued)

OTHER PUBLICATIONS

Wiam Zamrani, Esmail Ahouzi, Angel Lizana, Juan Campos, María J. Yzuel, "Optical image encryption technique based on deterministic phase masks," Opt. Eng. 55(10), 103108 (2016), doi: 10.1117/1.OE.55.10.103108. (Year: 2016).*

(Continued)

*Primary Examiner* — Thien M Le
(74) *Attorney, Agent, or Firm* — Muncy, Geissler, Olds & Lowe, P.C.

(57) ABSTRACT

A method to incorporate multiple independent optical correlators into one system. By "independent optical correlator," we mean an optical correlator comprising of an input SLM, filter SLM, and camera, combined with appropriate coherent illumination and Fourier transforming lenses. By "one system" we mean a single optical system which utilises the elements of each of the independent correlators multiple times.

14 Claims, 12 Drawing Sheets

(56) References Cited

U.S. PATENT DOCUMENTS

| | | | |
|---|---|---|---|
| 2010/0309467 A1* | 12/2010 | Fox | G01J 3/02 |
| | | | 356/326 |
| 2013/0100456 A1 | 4/2013 | Yu et al. | |
| 2015/0286340 A1* | 10/2015 | Send | G01J 1/0437 |
| | | | 345/175 |
| 2016/0004221 A1 | 1/2016 | Ayres et al. | |
| 2016/0055929 A1* | 2/2016 | Zhan | G02B 26/06 |
| | | | 250/251 |
| 2016/0062128 A1 | 3/2016 | Inoue et al. | |

FOREIGN PATENT DOCUMENTS

| | | |
|---|---|---|
| EP | 1004954 B1 | 5/2004 |
| EP | 1420322 B1 | 9/2017 |
| EP | 1546838 B1 | 5/2019 |
| GB | 2521111 A | 6/2015 |
| WO | 9931563 A1 | 6/1999 |
| WO | 0052563 A1 | 9/2000 |
| WO | 2004029746 A1 | 4/2004 |

OTHER PUBLICATIONS

International Search Report and Written Opinion dated Aug. 24, 2018 in International Application No. PCT/EP2018/056765.
UK IPO Search Report: dated Sep. 15, 2017 in GB Application No. 1704319.1.

\* cited by examiner

OPTICAL PROCESSING SYSTEMS

This application is a 371 National Phase of PCT Application No. PCT/EP2018/056765, filed on Mar. 16, 2018; which claims priority to European Patent application 1704319.1 filed Mar. 17, 2017 and each of which is herein incorporated by reference in its entirety.

TECHNICAL FIELD

The invention relates to optical processing. Certain embodiments of the invention concern optical correlation based processing systems and optical pattern recognition systems.

BACKGROUND AND PRIOR ART KNOWN TO THE APPLICANT(S)

In coherent processing systems, such as optical correlators, a laser or other coherent source is typically employed to be modulated in either phase or amplitude, or a combination of the two by one or more spatial light modulator (SLM) devices. These typically incorporate liquid crystal devices but may also be micromirror microelectromechanical (MEMs) devices. Optical correlator devices are typically used as optical pattern recognition systems, such as the systems described in EP1546838 (WO2004/029746) and EP1420322 (WO99/31563). In a 4f Matched Filter or Joint Transform Correlator (JTC) system, the SLM devices are addressed with functions that represent either input or reference patterns (which can be images) and/or filter patterns, usually based upon Fourier transform representations of reference functions/patterns that are to be "matched" to the input function.

A camera such as a complementary metal-oxide-semiconductor (CMOS) or charged couple device (CCD) sensor is typically positioned in the output plane of the optical system to capture the resulting optical intensity distribution, which in the case of an optical correlator system may contain localised correlation intensities denoting the similarity and relative alignment of the input and references functions.

The most common function used in the type of coherent optical systems concerning both the prior art and the invention is the optical Fourier Transform (OFT)—the decomposition of a spatial or temporal distribution into its frequency components. This is analogous to the pure form of the two-dimensional Fourier transform denoted by the following equation:

$$G(u, v) = FT[g(x, y)] = \int\int_{\pm\infty} g(x, y)\exp[-i2\pi(ux + vy)]dxdy, \quad (1)$$

where (x,y) represent space/time variables and (u,v) are frequency variables.

The OFT may be achieved by the optical system shown in FIG. 1 where collimated coherent light of wavelength A (typically laser light) 1 is modulated in phase or amplitude by a Spatial Light Modulator 2 (typically a liquid crystal or electro-mechanical MEMs array). The modulated beam is then passed through a positive converging lens 3, of focal length f and focussed in the back focal plane of the lens, where a detector such as a CMOS array 4 is positioned to capture the intensity of the resulting Fourier transform.

In optical processing systems, the OFT may be employed as a direct replacement of the electronic/software-based Fast Fourier Transform (FFT) family of algorithms, offering significant advantages in terms of process time and resolution. This process may be used as the basis of a variety of functions. The function of primary concern in this application is optical correlation (used in pattern recognition, comparison, or analysis).

Correlation between two or more functions may be achieved in an optical system in two main ways. The first way is a Matched Filter process, denoted by the following equation:

$$r(x,y)*g(x,y)=FT[R(u,v)^* \times G(u,v)] \quad (2)$$

Where upper case functions represent the Fourier transform of their lower case equivalents; "*" indicates the complex conjugate of the adjacent function and "*" denotes the correlation function.

The second way to achieve correlation is to use a Joint Transform Correlation process, such as the 1/f JTC described in EP1546838 (WO2004/029746).

In each case the correlation is formed as the inverse Fourier transform of the product of two functions, which have themselves been Fourier transformed.

FIG. 2 shows a "4f" optical system that can be used to realise a matched filter or derivative process. FIG. 2 shows a collimated coherent light 5 of wavelength A which is modulated by SLM pixel array 6, and then transmitted through lens 7 and focussed on the second SLM pixel array 8, forming the OFT of the function displayed on the first SLM, at the pixels of the second SLM 8. The resulting optical matrix multiplication is then inverse Fourier transformed by lens 9 and the result is captured at the detector array 10 (which may be a camera).

For a matched filter process, the pattern displayed by the pixels of the first SLM 6 will be the "input scene" g(x,y) and the pattern displayed on the second SLM 8 will represent a version of the Fourier transform of the reference function r(x,y). For example, the "input scene" or input data may be DNA data for a specific individual to be matched against a reference image or a series of images such as DNA data for various diseases. The output data captured by the detector array 10 highlights matches between the two sets of DNA data being matched, including the level of match and alignment.

WO00522563 and EP1004954 each describe the use of multiple optical correlators.

Embodiments of the present invention offer improved optical processing compared to the prior art.

SUMMARY

In a first aspect, there is provided an optical processing system comprising two or more optical correlators, each correlator comprising an optical input spatial light modulating device and a filter spatial light modulating device, wherein, in use, the system receives an optical input forming a plurality of optical paths within the system, each optical path from each input spatial light modulating device through to each filter spatial light modulating device.

In other words, an optical processing system comprises of a number of optical correlators (input SLMs, filter SLMs, and cameras with appropriate optics) sharing the same optical hardware, so as to allow re-use of the optical hardware along a multiplicity of optical paths through the system, thereby increasing the number of effective optical correlators.

The SLMs may be binary SLMs for example.

Methods to incorporate multiple independent optical correlators into one system are provided. By "independent optical correlator" we mean an optical correlator as known in the art, comprising an input SLM, a filter SLM combined with appropriate coherent illumination and Fourier transforming lenses. By "one system" we mean a single optical system which utilises the elements of each of the independent correlators multiple times across different independent correlators in order to achieve higher performance by "reusing" the same optical hardware. The optical output of each correlator is detected, for example a camera which is comprised in the "one system".

The "one system" according to the invention therefore achieves multiple optical paths within the single optical correlator itself without requiring multiple optical correlators.

For example, a system with two input SLMs and two filter SLMs can be configured such that there are four optical paths through the optical system, from each of the input SLMs through each of the filter SLMs. As such, with the optical hardware required for two independent correlators, four independent correlators may be implemented. Similarly, with four input SLMs and four filter SLMs, there are 16 independent optical paths possible through an appropriately-configured system. As such, with the optical hardware required four independent correlators, 16 independent correlators may be implemented. A single camera sensor or a plurality of camera sensors can be configured in the output plane as appropriate.

For example, a beam splitting element is configured to split the optical input into two orthogonal directions and wherein two of said spatial light modulator devices are orthogonal to one another. In some embodiments, the beam splitting elements is a "solid block" element for example made of glass.

Advantageously, the optical correlator system may be modular. By "modular" we mean a system with one or more "modules" which may be advantageously added to expand the "one system" as required, without requiring the use of multiple optical correlators as known in the art. In a modular optical correlator system comprising multiple input SLMs and filter SLMs which produce correlation peaks on a single camera sensor, methods to determine which input SLM and filter SLM corresponds to a given correlation peak are provided. These methods are predicated on using a symbolic representation of the data such that the "footprint" of the data is defined. For example, 1D data may be encoded across a row of a height of number of pixels on the input SLM. The relative location of a correlation peak within this row is deterministic.

Firstly, to determine which input SLM corresponds to a given correlation peak, a plurality of methods can be used. In the first case, the input images are shifted spatially across the SLM. This causes a corresponding shift in the correlation peak. The location of the correlation peak can be related to a specific input SLM based on the location of the spot with respect to the input reference. In the second case, a beamsplitter is used to split the output across a plurality of camera sensors at different optical path distances from the final lens. The input SLMs are shifted correspondingly along the optical path so that each camera is in the image plane of one SLM. Thence, a peak will appear on one of the plurality of cameras, corresponding uniquely to one of the input SLMs.

Secondly, to determine which filter SLM corresponds to a given correlation peak, a plurality of methods can be used. In the first case, the filter SLM has a small tilt induced which correspondingly translates the location of the correlation spot. In the second case, when a given filter is created it is combined with a specific phase-tilt in order to impose a known translation on any correlation peak. The known translation of a correlation spot relative to the footprint of the data on the input SLM can be used to uniquely determine which filter SLM a given correlation peak is due to.

Accordingly, in subsidiary aspects there are provided the following systems:

A system as described above, where the specific input and filter SLM pair which corresponds to an observed correlation peak can be determined.

A system as described above, whereby the input SLM corresponding to given a correlation peak is determined by the position of the correlation peak, dependent on the translation of data across the input SLM.

A system as described above, whereby the input SLM corresponding to a given correlation peak is determined by which of a plurality of camera sensors shifted along the beam a given peak appears on, with the input SLMs shifted corresponding to the cameras.

A system as described above, whereby the filter SLM corresponding to a given correlation peak is determined by the position of the correlation peak, dependent on the tilt induced into a filter SLM which leads to a corresponding shift of the correlation spot relative to the symbols shown on the input SLM.

A system as described above, whereby the filter SLM corresponding to a given correlation peak is determined by the position of the correlation peak, dependent on a shift induced upon the calculation of an appropriate filter, such as by translating the symbol before taking a fast Fourier transform.

A system as described above, whereby the filter SLM corresponding to a given correlation peak is determined by the position of the correlation peak, dependent on a shift induced upon the calculation of an appropriate filter, such as by applying a phase-ramp to the filter.

In another aspect, there is provided a method of identifying a sequence such as a genetic sequence, the method comprising the steps of:

receiving sequence input data;

converting the input data to a plurality of binary symbols to obtain a binary or greyscale map, wherein a binary or greyscale symbol has a predetermined size m pixels in width and n pixels in length; and optically processing the binary or greyscale map to identify a sequence.

This method of identifying a sequence can be employed by an optical correlation-based processing system or a co-processor using any of the systems as described above. Advantageously, this results in a much faster sequence identification than can be achieved in the prior art. By a co-processor we mean a system suitable for supplementing the functions of a primary processor such as a conventional CPU. Advantageously, this leads to augmented high-performance computing (HPC) which represents a significant improvement over the prior art.

In a subsidiary aspect, the genetic data can be represented by other methods which convey the underlying data structure. For example, the data can be represented as a graph which is then used by the SLM to encode information into the optical field.

In a subsidiary aspect, these techniques can be applied to data-sets other than genetic data. For example, any sequential or string-based data can be represented and then searched using these techniques. It will be appreciated that these techniques are not uniquely applicable to genetic data, but can be applied to any 1D digital data stream.

DETAILED DESCRIPTION

Figure 1:
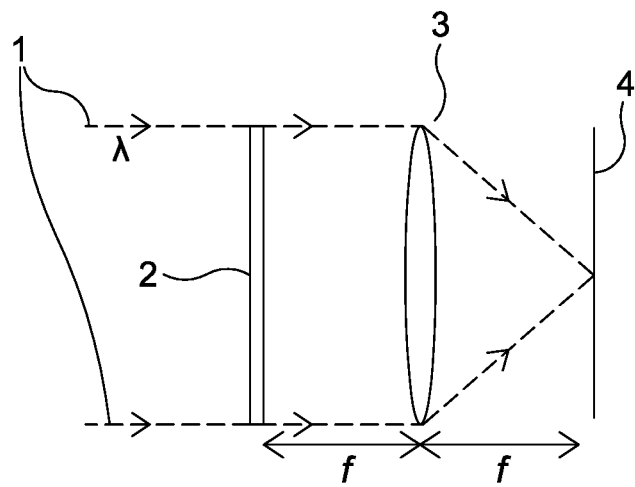
FIG. 1 is an optical path diagram derived from the applicant's own prior art.
Figure 2:
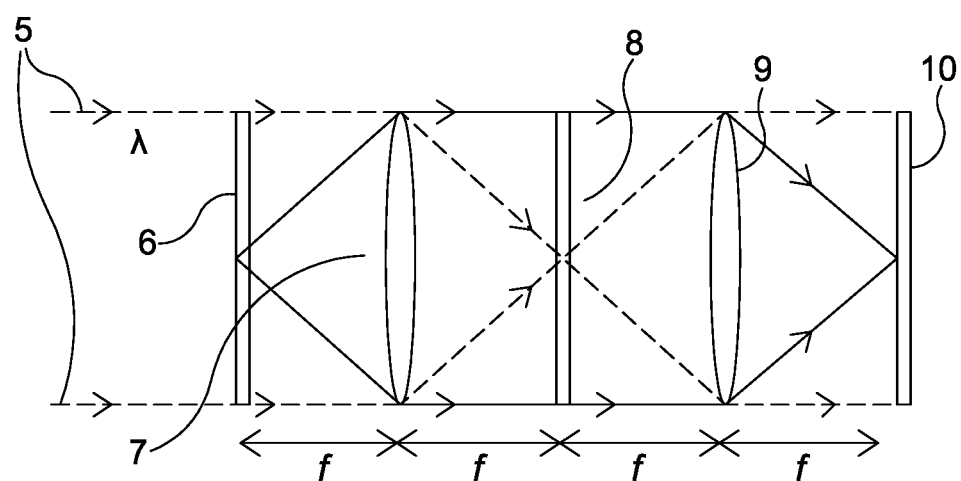
FIG. 2 is another optical path diagram showing a known "4f" optical system.
Figure 3:
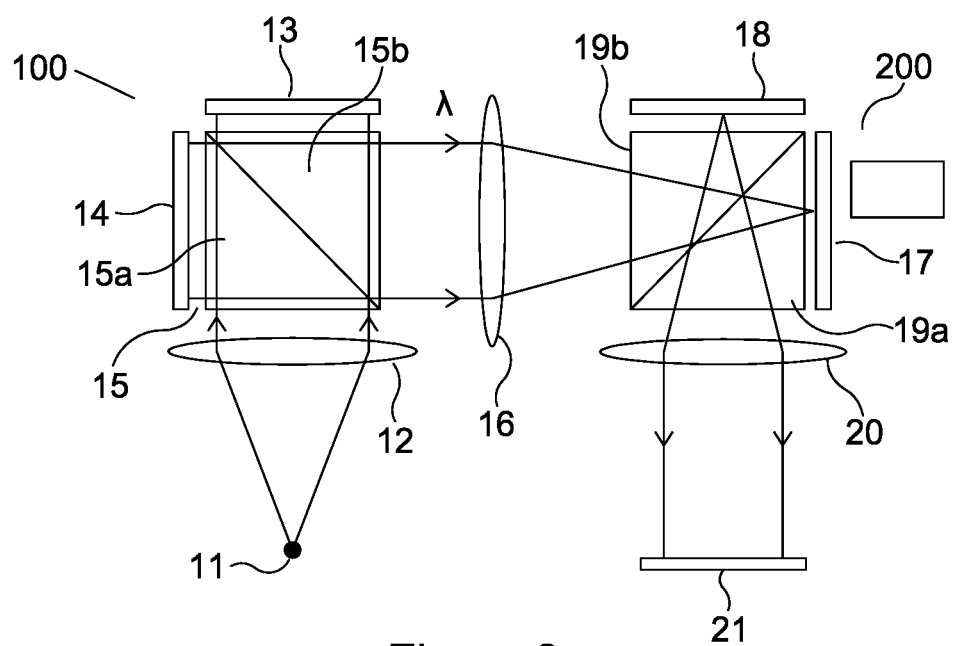
FIG. 3 shows a modular system according to the invention, using two input SLMs and two output SLMs.

FIG. 3 shows an embodiment of how a system with two input SLMs and two filter SLMs may be realised according to the invention. The system of FIG. 3 is based upon the classical "4f" architecture but has important differences.

Coherent light of wavelength A is emitted from a laser source 11 and transmitted through a collimating lens 12 to a first module 100. In some embodiments, the laser is delivered to the system through a single-mode optical fibre. The first module 100 comprises two reflective input SLMs 13, 14 and a first beamsplitter 15. Each of the SLMs may be a pixel array such as a liquid crystal array or a MEMs pixel array. In some embodiments, the SLM includes a high resolution pixel array containing several millions of pixels. Arranged within the array is an input scene g(x,y).

This approach can be combined with a solid block approach. The beamsplitter is a solid block of cubic form in this example. The two input SLMs 13, 14 are bonded using optical adhesive, or sufficiently adjacent to the sides of the beamsplitter so that they are positioned orthogonal to each other, and optically positioned coincident with each other. The beamsplitter is formed of two glass prisms 15a, 15b. In preferred embodiments, the glass prisms are formed of the same glass of the same refractive index, with a partially reflective coating at their interface (e.g. a half-silvered mirror or other appropriate coating). The beamsplitter 15 preferably splits the light evenly into two orthogonal directions so that incoming light received by the beam splitter is transmitted in equal proportions to the first and second input SLMs. It will be appreciated that the proportions into which light is split does not have to be 50% per input SLM, but the proportions may vary provided some light emission is received by both input SLMs. The proportion of light is deliberately varied to account for evenly splitting the light between optical modules, as more modules are added to the system.

The output from the first module is transmitted through a lens 16 and focussed on a second module 200 comprising two filter SLMs 17, 18 and a second beam splitter 19. The second module in this example is substantially identical to the first module 100. In particular, the second beamsplitter is substantially the same as the first beamsplitter—that is a solid block formed of two glass prisms 19a, 19b with a partially reflective coating.

The filter SLMs 17, 18 of the second module 200 each receive the OFT (optical Fourier transform) of the function displayed on the first SLMs. Each of the filter SLMs may be a pixel array such as a liquid crystal array or a MEMs pixel array. In some embodiments, the SLM includes a high-resolution pixel array containing several million pixels. Arranged within the array is a filter scene R(x,y). The filter scene may be the Fourier transform of one or more reference images to be matched against the input scene (insofar as the modulating range of the SLM permits this to be shown, and account of this limitation is made). In practice, this may be a series of reference images such as images derived from a DNA sequence. The result is focussed through a lens 20 and the result captured at a detector, in this case a digital camera 21. Lenses 16 and 20 preferably produce a Fourier Transform of the respective incoming beams at an appropriate plane. The laser 11 and camera 21 may also be bonded to glass in a similar manner as the SLMs are bonded to the beam splitter. Matches are shown as spots detected by the camera such as those shown in FIG. 5.

Accordingly, FIG. 3 shows a modular optical processing system comprising an optical input, at least one optical processing module, and a detecting element; wherein the at least one optical processing module comprises two or more spatial light modulator devices and a beam splitting element for splitting the optical input and transmitting the optical input to the two or more spatial light modulator devices.

By "modular" we mean a system with one or more "modules" which may be advantageously added to expand the system as required. The modular approach therefore enables the optical system to be extended for example adding further input or filter SLMs. A "module" comprises two or more spatial light modulator devices (SLMs) and a beam splitting element. The modularity of the system also increases robustness.

For example, a module has at least one input SLM and at least one filter SLM. In preferred embodiments, a module can include two or more input SLMs. Advantageously, by including two sets of input data, the processing speed is doubled. It will be appreciated that the optical system may be expanded by including further Fourier transform lenses and additional modules as required.

The beam splitting element may be configured to split the optical input into two orthogonal directions and wherein two of said spatial light modulator devices are orthogonal to one another. The cubical shape enables the modules to be built in a "solid block" or "solid optics" approach. It also enables the various electro-optic components (optical input such as a laser, SLMs, detecting elements such as a camera) to be bonded to the glass therefore reducing or eliminating local vibrations and particulates entering the system, therefore improving accuracy of the system. The solid block approach is advantageous as it enables the modular aspect of the system whilst providing for a robust system with little vibration and thus more accurate and precise optical processing. By a "solid" block we mean a block of glass or other suitable material wherein light travels through the material (rather than air).

Figure 4:
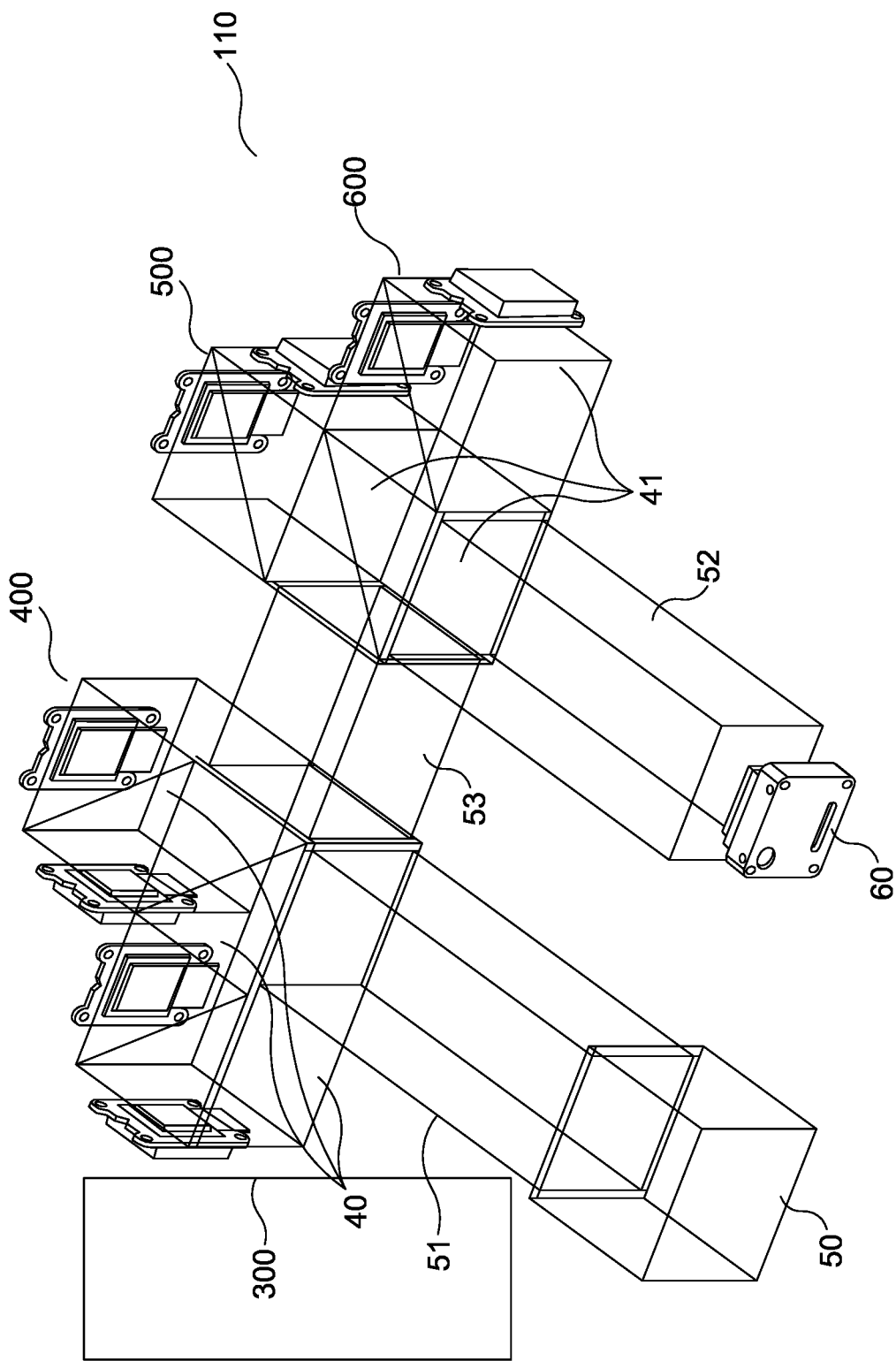
FIG. 4 shows a modular system according to the invention, using four input SLMs and four output (i.e. filter) SLMs.

This approach advantageously enables the optical system to be extended, gaining a quadratic increase in performance as additional optical hardware is incorporated, including additional modules with further input and filter SLMs. FIG. 4 is a perspective view showing how the system could be extended. In particular, the system 110 of FIG. 4 uses four input SLMs (two per module 300, 400) and four filter SLMs (two per module 500, 600). In this example, three beam splitters 40 and 41, respectively are used to direct light to the input/filter SLMs. For simplicity, the figure does not show each one of the lenses that might be used to implement the Fourier transforms, in addition to the laser input.

In FIG. 4, the laser source is schematically represented at 50 and the camera is shown at 60. Multiple light beams from multiple optical sources may also be used and combined as required by the system. In between the laser source, SLM modules and camera the system includes a solid glass assembly formed of solid blocks 51, 52 and 53 which guide the optical path. Solid block 53 includes or may itself constitute a Fourier transform lens where a Fourier transform of the incoming beams is produced. Similarly, solid block 52 may be configured to perform an inverse Fourier transform.

The system of FIG. 4 effectively includes 16 optical correlator paths, from each of the four inputs to each of the four filters. This illustrates the effective utilisation of the optical hardware. Extensions to this approach are possible for incorporating additional SLMs to further scale the processing throughput and increase the number of effective independent correlators.

The laser light projected through the system represents an information carrier. The information or input data, for example a genome sequence or other pattern, is presented to the two or more input SLMs. The encoding of the input data, discussed later, defines a footprint within which the correlation peak can occur. The location of the input data within this footprint can be used to determine which of the optical correlator paths the corresponding peak corresponds to.

In preferred embodiments the input data and/or filter data may be shifted in the x or y directions, in particular relative to the other input SLMs. This may be the result of a hardware displacement, the control electronics, or other programming routing applied to a particular SLM. The shifting may be a shift of say n pixels in either the x or y directions for each one of the input scenes of the second, third and further SLMs. In one practical embodiment, the shift may be a shift of a binary snippet by +1 for the second SLM, +2 for the third SLM and +3 for the fourth SLM. A four input SLM configuration operating in conjunction with four filter input SLM allows in certain embodiments 16 unique pairings to be concurrently processed.

Figure 5:
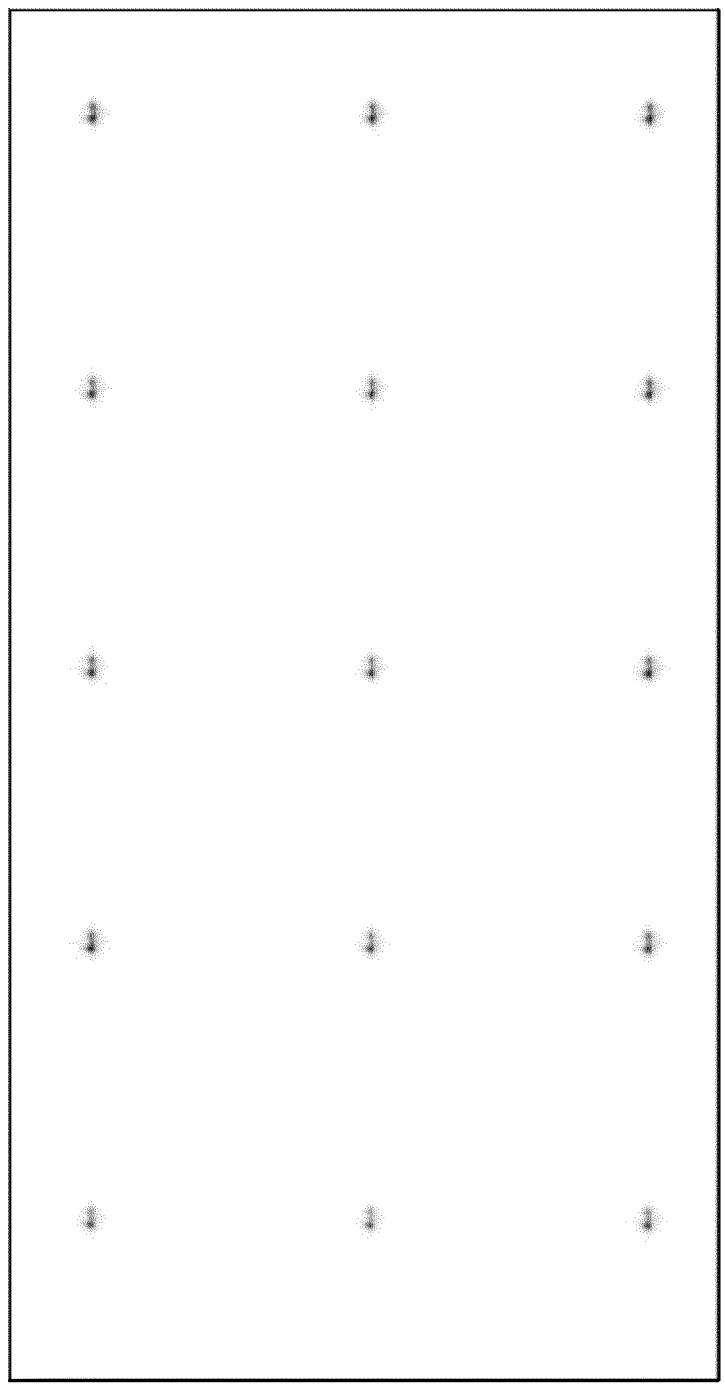
FIG. 5 shows test data from a system with two input SLMs of a system module, with one input SLM data being shifted by one pixel in the x direction.

FIG. 5 shows test data received by the camera in a system with two input SLMs of a system module, with one input SLM data being shifted by one pixel in the x direction relative to the other input SLM data. Effectively, this results in a "dual input" with spatial separation of the input data from multiple SLMs in order to establish from which input SLM the resulting correlation peak has been obtained. The intensity peaks shown in FIG. 5 are examples of a match between the input scenes and the filter scenes. This is also advantageous in terms of allowing the results to be distinguished in embodiments when two input SLMs are employed concurrently with a single filter SLM. In alternative embodiments, the data is shifted in the y direction. In further embodiments, the reference string of data or scene may be shifted in the filter SLMs in the y direction. The shift may be of n pixels in the y direction. N may be a different integer for each one of the SLMs. For example, n may be +1 for the second filter SLM in the y direction, +2 for the third filter SLM in the y direction and +3 for the fourth filter SLM in the y direction.

Figure 10:
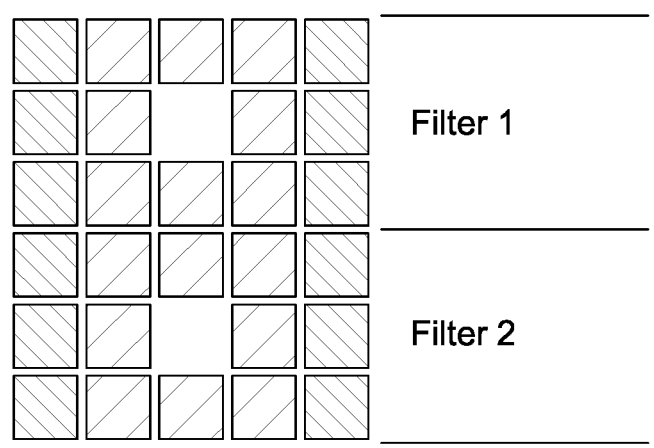
FIG. 10 shows how a system can be designed such that spots on a given sub-set of camera pixels correspond to correlations arising due to filters displayed on different filter SLMs.

In one embodiment, correlation peaks due to the two filter SLMs may be shifted (either in the x or y direction). In one case this is achieved by inducing a small tilt in one of the SLMs. In an alternative embodiment, filter data from one SLM is shifted in the y direction by a number of pixels prior to the FFT-based (Fast Fourier Transform) filter generation calculation. In a further alternative embodiment, phase-tilts are applied after the FFT filter calculation. FIG. 10 shows how different camera pixels can be assigned to correspond to different filters by incorporating an appropriate shift relative to the underlying symbols on the input data.

In systems using multiple input SLMs such as the system of FIG. 4 (which uses 4 input SLMs), data may be shifted using software for one or all of the SLMs so that preferably each input is spatially different to the other inputs (there is an "individuality" for each input). This avoids batch processing and thus provides for much faster and efficient processing. Looking at the exact pixel position eventually received by the camera it can thus be determined which input SLM and filter SLM pairing the correlation intensity originates from. An image received by the camera sensor can be divided into identifiable rows and columns of pairings between different SLMs and filters and the shifting of data helps to establish which input-filter pairing produced that match. In a preferred embodiment, the pixels in the camera may be attributed to specific input-filter pairings. Thus a 2-input, 2 filter SLM system may be used to effectively produce the same results as four 1-input, 1-filter correlators (with each input scene being processed against the 2 filters)—but using the same optical system. This performance may be further increased by adding further input and filter SLMs to the system, as shown in FIG. 4, where 4 input SLMs and 4 filter SLMs are used to produce the equivalent performance of 16 independent correlator systems (each of the 4 inputs being correlated against the 4 filters), all within one optical system.

Figure 6:
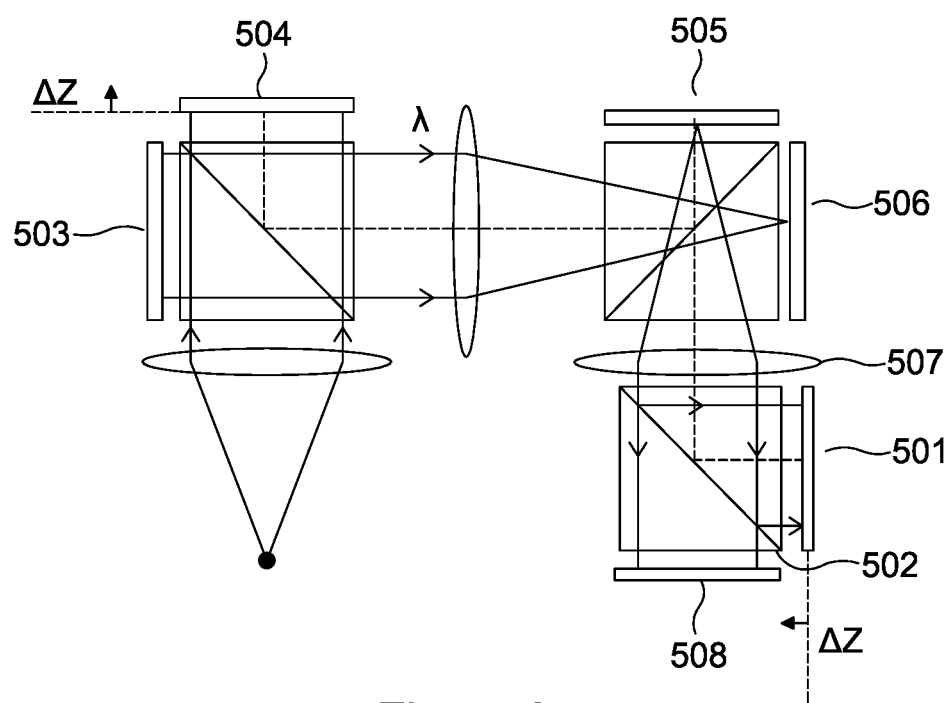
FIG. 6 shows a similar layout to the system shown in FIG. 3, with the addition of a second CMOS sensor and beamsplitter.
Figure 9:
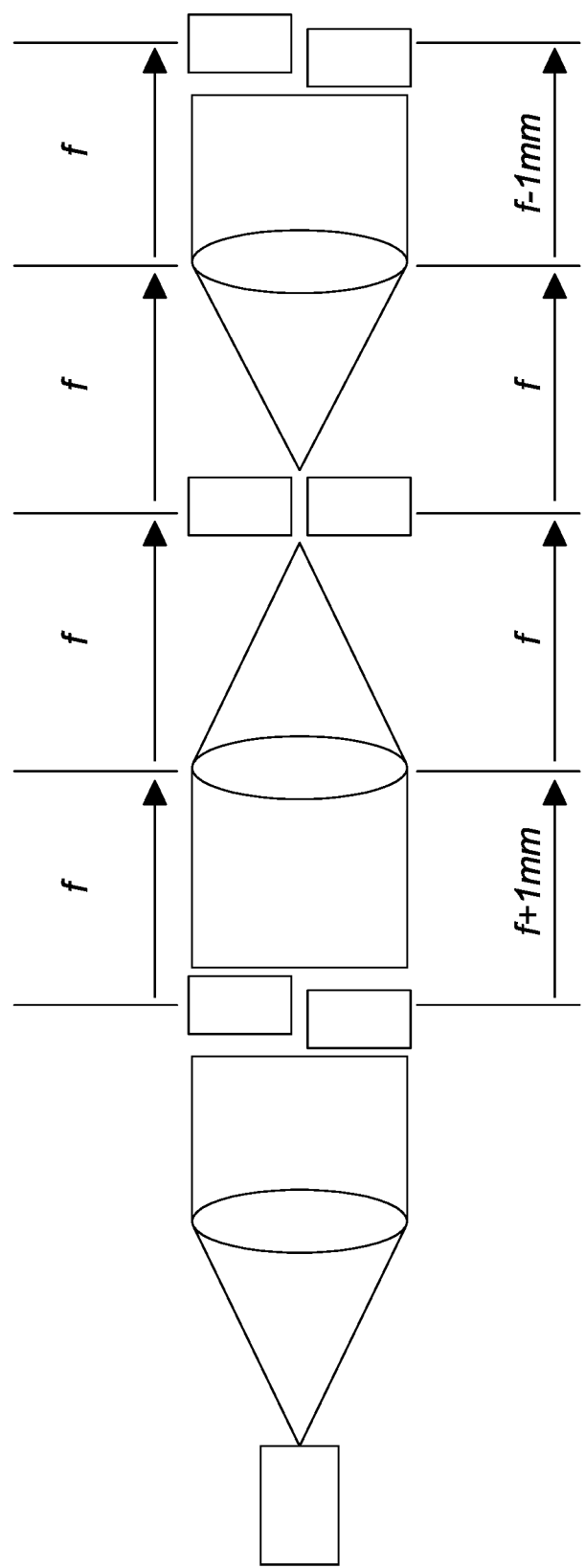
FIG. 9 shows an un-folded (no mirrors or beamsplitters) optical system and the process by which an input SLM and corresponding camera can be shifted in order to cause separation of the plane in which correlation peaks form, thus permitting discrimination of the corresponding input SLM.

An alternative method to achieve multiple correlation processes through a single optical system is shown in FIG. 6. This is a similar layout to the 4-f system shown in FIG. 3, with the addition of a second CMOS sensor 501 and beamsplitter 502. As in FIG. 3, there are two input and two filter SLMs in the system, which again are being used with a single optical system to perform as four independent correlator systems. However, in this case the correlation image plane that relates to the pairings of the first input 503 and the two filters 505, 506 is physically shifted. This is achieved by displacing the input SLM 503 and the camera 502, by the distance Δz along their optical path, denoted by the dotted line. The optical path length between the input SLM 503 and camera 502 remains unchanged. FIG. 9 shows this same optical system 'unfolded' so as to remove mirrors and beamsplitters and represent the optical paths through the system in parallel.

Displacing the input image plane by Δz along the beam has the direct effect of displacing the resulting Fourier transform plane of the system by the same distance (or in the case of a system with an optical scaling in the Fourier transform system, an appropriately scaled distance) in the opposite direction. Thus, the correlation plane related to the first input scene is no longer coincident with the correlation plane related to the second input scene. Camera sensor 502 is therefore also shifted by a distance Δz accordingly. Thus the correlation intensities related to the first input may be seen on the first camera 508 and the correlation intensities relating to the second input and filters may be seen on the second camera 501. Adding further input and filter SLMs to the system (for example the input and filter SLMs as arranged in the system shown in FIG. 4) allows this method to be extended so that more non-coincident correlation planes may be produced within the confines of a single optical system.

Figure 7:
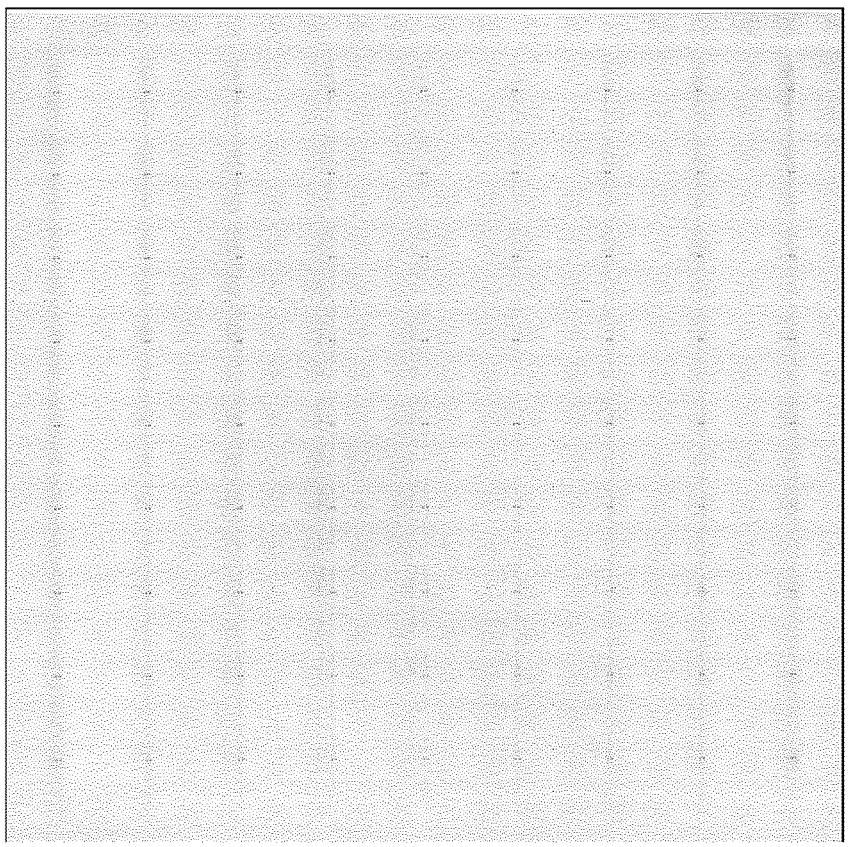
FIG. 7 shows two correlation planes from the two-camera system showed in FIG. 6.
Figure 7:
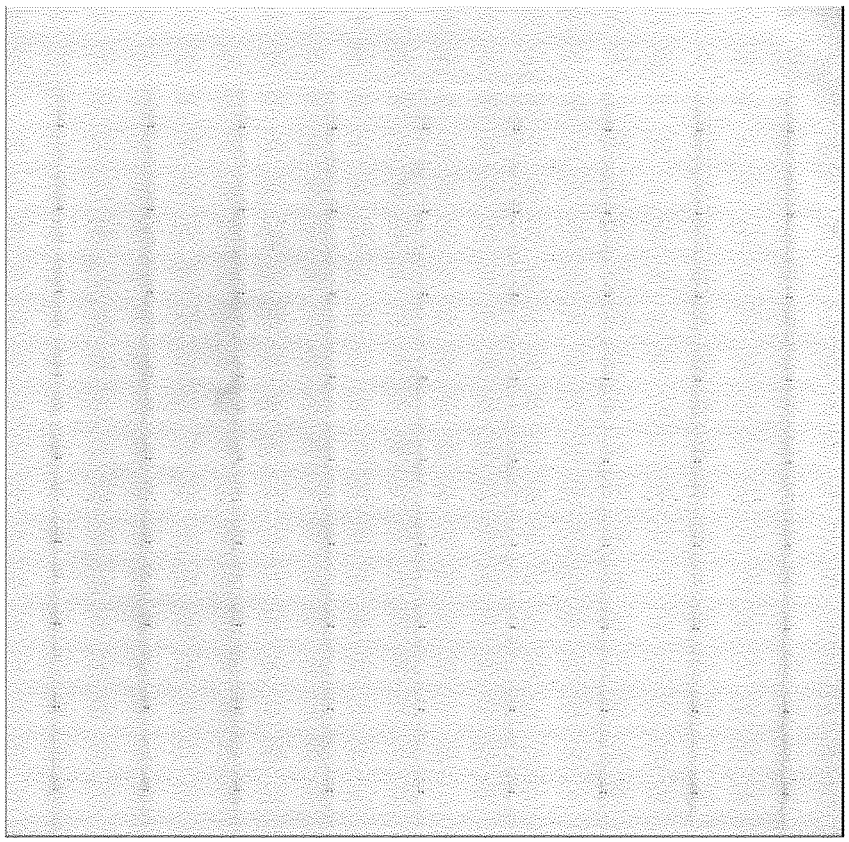

This may be seen in FIG. 7, which shows two correlation planes from the two-camera system showed in FIG. 6. Both images contain a grid of identical correlation spots which relate to the pairings of multiple, equally spaced repetitions of a function displayed in the input, with a corresponding function represented in the two filter SLMs. The translation between the two spots is induced by slightly tilting one of the filter SLMs with respect to the other. The occurrence of the spots on the different camera sensors is due to the shifting of the camera sensor and input SLM along the beam, causing the spots to focus onto the cameras differently even though the same information is contained within each optical path. Both images are independent of each other yet are produced instantaneously by the same optical system.

Preferably, the input/filter SLMs are binary SLMs, although greyscale SLMs may also be used. For example, binary SLMs may include liquid crystals SLMs, ferroelectric SLMs, micro-electrical mirror devices (MEMs) or multipixel grids. In certain embodiments, the SLMs may modulate phase and/or amplitude. Binary ferroelectric SLMs offer much faster switching speeds and frame times and it can be preferable to stream input data much faster than filter data. For example, greyscale filter data may be streamed at 60 to 240 frames per second, whilst input data is streamed at 2400 frames per second or faster (at least 10 to 40 times faster than the filter data).

Typically the frame rate of the camera will be slower than that of the binary SLM, for example operating at approximately 300 frames per second. One way to accommodate this frame speed mismatch is to compare multiple binary input frames against a smaller number of filter frames, all within one frame of the camera sensor. This leads to a form of "batch processing", where a detected correlation intensity in a single camera frame will indicate one of several possible matches. A further interrogation must then be performed to ascertain the specific match. This interrogation can be performed either by the optical correlator, or but an associated digital computer.

Figure 8:
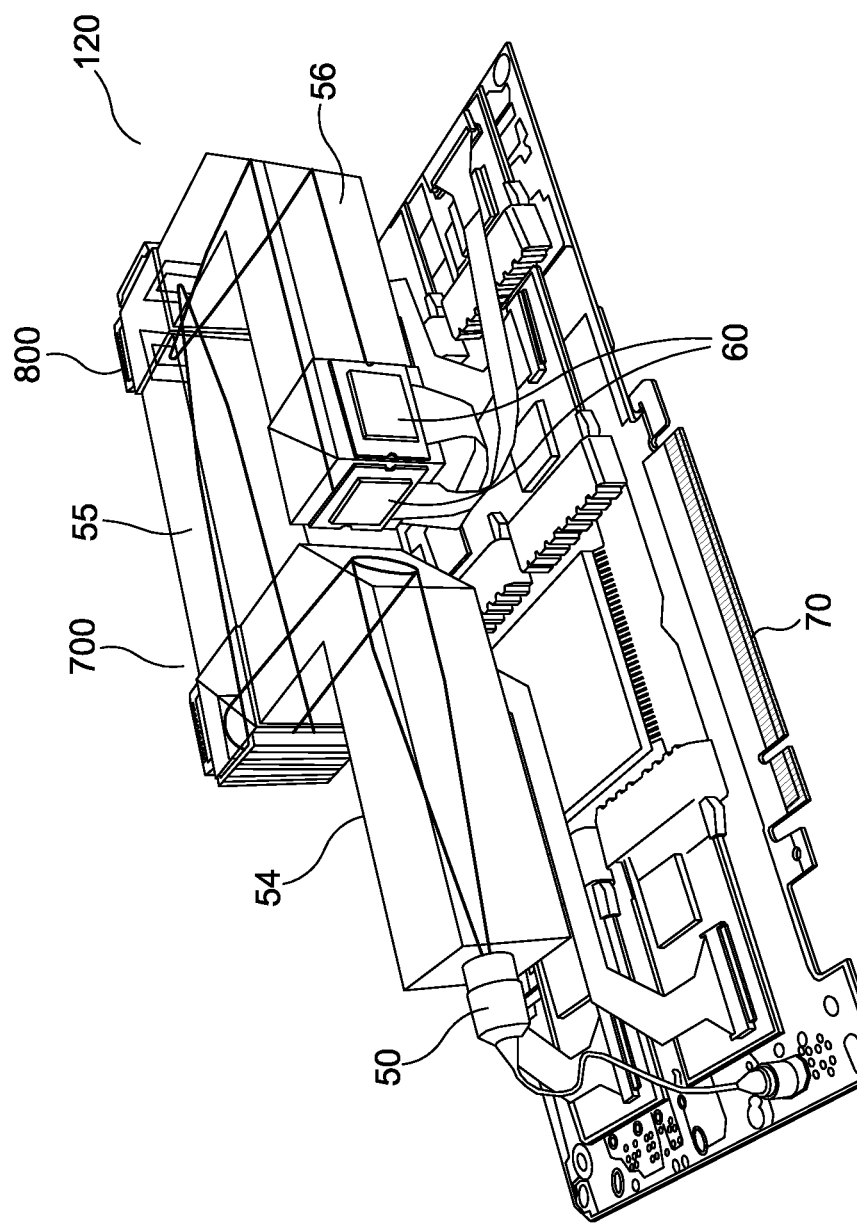
FIG. 8 shows an optical co-processor using a modular system according to the invention.

FIG. 8 shows an optical co-processor system 120 using a modular system as described above. The co-processor comprises a laser source 50, two SLM modules 700, 800 including two SLMs and beam splitters as described above, and two cameras 60. Again, system components are connected by a solid glass system formed of solid blocks, 54, 55, 56 and the cameras 60 are bonded to the blocks as shown in FIG. 8. Blocks 55 and 56 each include a Fourier transform lens (not shown). The optical system is mounted to a driver PCIe card and an open application programming interface (API) is used in this example to process the information represented by the optical correlation which the system performs.

The system 120 of FIG. 8 may be used in a number of applications, including alignment searches to identify one or more patterns in for example nucleotide and protein sequences.

The system may be used to achieve exact and similarity searches including short and long reads, as appropriate.

FIG. 9 shows this same optical system 'unfolded' so as to remove mirrors and beamsplitters and represent the optical paths through the system in parallel.

Symbolic Substitution

Systems according to the invention as described above have applications in matching sequences of data, or images against a reference image.

In one embodiment, the system is used to locate specific sequences of peptides or amino acids in large protein sequences. In this application, data representative of specific amino acid sequences may be streamed through input SLMs to find matches where they match reference sequence data streamed through filter SLMs.

Figure 11:
FIG. 11 shows a TGAC "read" string in a genome sequencing application and its conversion to a binary filter input.
Figure 11:
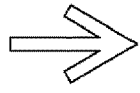

The system is used to locate specific sequences of nucleotide bases ('genetic sequences') against a reference DNA sequence. In this example, DNA samples as produced by sequencer machines are available in the art. DNA "read" strings or "snippets" are generated from the sequencer machine, typically 101 or 301 base pairs in length and consisting of 4 nucleotide bases, T, G, A, C as shown in FIG. 11. The TGAC string of FIG. 11 is to be converted to a binary data set or input as illustrated and according to a method described in more detail below. Representations of different data are tiled across the SLM.

Figure 12:
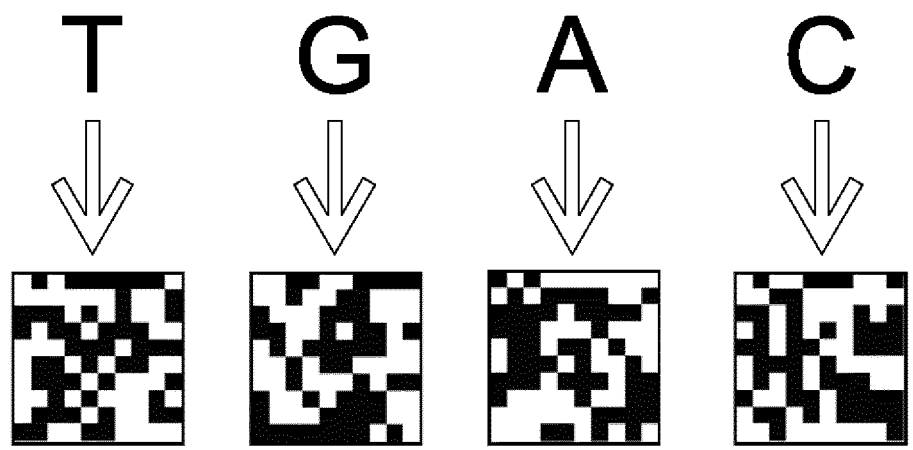
FIG. 12 shows individual TGAC base characters being converted to binary symbols.

The DNA sequence is converted into a pixelated array. A binary symbol generator is used to convert the input sequence data to binary symbols as shown in FIG. 12, whereby TGAC base characters are each converted to binary symbols. With reference to the previous embodiments, the sequences to be identified—or snippets—are displayed by the input SLMs. A corresponding representation of the DNA reference database sequence is prepared under the same encoding. This is converted to a filter using, for example, a Fast Fourier transform and is displayed by the filter SLMs. When the snippet is identified in the filter SLMs a result is displayed in the camera by one or more dots as appropriate. The dots also indicate whether or not a full or partial match has been obtained by way of their intensity, which is directly proportional to the proportion of common information in the data being compared.

Figure 13:
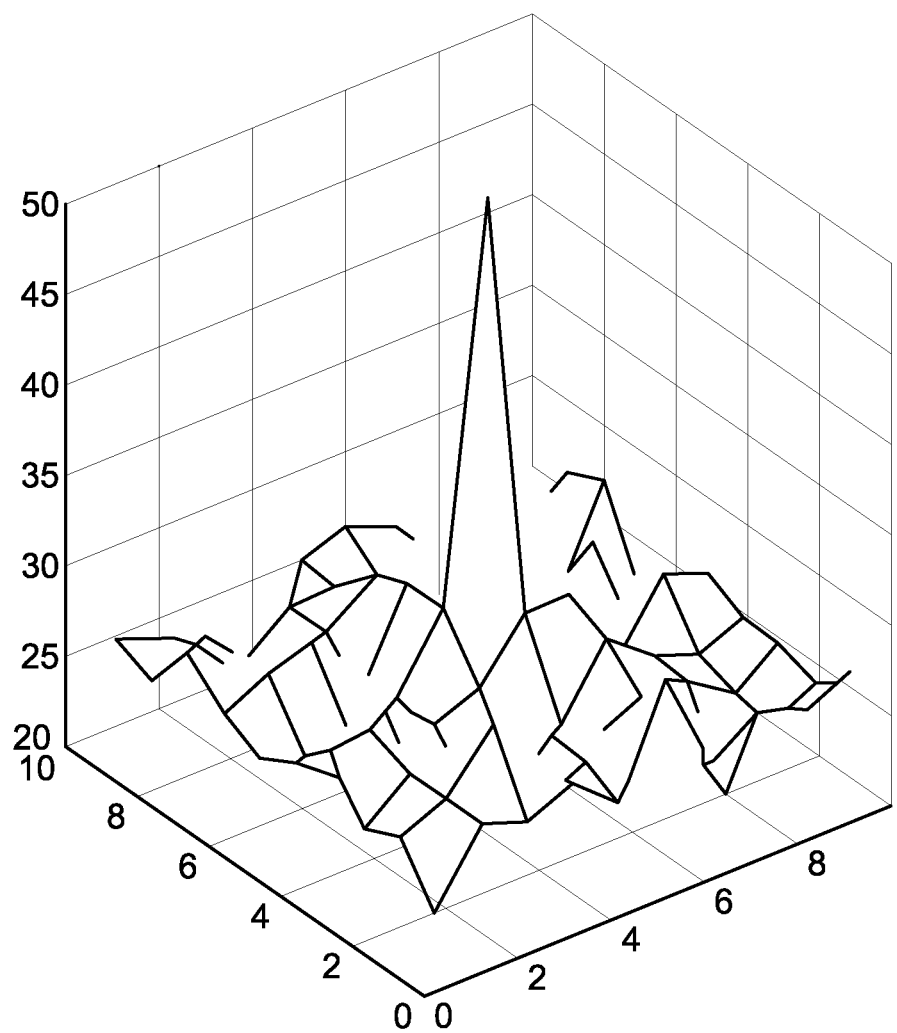
FIG. 13 shows an example correlation map between two symbols.

It is clear from FIG. 13 that this symbolic encoding defines a 'footprint' within which a correlation peak can be expected to form. As such, the techniques described above permit control of the precise location of this correlation peak within this footprint based on the particular input SLM and filter combination, allowing discrimination of what the correlation peak corresponds to.

This optical approach uses correlation pattern recognition wherein each base character is mapped to a binary symbol. The symbols are generated by finding lowest matching correlations levels between each symbol. This increases the likelihood of identifying a sought-after sequence in a large and very complex DNA sequence.

The representation of 2D data on the input and filter SLMs is made in accordance with complex (amplitude and phase) characterisation data acquired for the two SLMs.

In another embodiment, the symbols are not binary, but make use of multiple levels. This would preclude the use of a binary SLM to represent the input.

In another embodiment, the DNA reference database is encoded and displayed directly on the input SLM. The data to be searched is encoded similarly, and converted to a filter using, for example, a Fast Fourier Transform. This is displayed on the filter SLM.

In another embodiment, the genetic data can be represented by other methods which convey the underlying data structure. For example, the data can be represented as a graph, which is then encoded as a 2D representation suitable for display on an SLM. The input SLM is then used to display a genetic sequence encoded in this manner. Further, the sequence being sought is encoded in a similar manner, and an appropriate filter generated (using, for example, a Fast Fourier Transform) which is displayed on the filter SLM.

The invention claimed is:

1. An optical processing system comprising an optical input an optical output a first optical input spatial light modulating device (SLM); a first filter spatial light modulating device; at least either a second optical input spatial light modulating device (SLM) or a second filter spatial light modulating device; and a Fourier transform lens between said first optical input spatial light modulating device (SLM) and said first filter spatial light modulating device; whereby said devices are configured to form two or more optical correlators wherein each correlator comprises an optical input spatial light modulating device (SLM) and a filter spatial light modulating device, wherein, in use, the system input forms at least a first optical correlation path with an optical input spatial light modulating device (SLM), said Fourier transform lens and a filter spatial light modulating device; and a separate optical correlation path independent from said first path with an optical input spatial light modulating device (SLM), said Fourier transform lens and a filter spatial light modulating device; whereby a plurality of optical correlation paths are provided within the system between said optical input and said optical output.

2. The optical processing system according to claim 1, wherein said spatial light modulator devices are reflective.

3. The optical processing system according to claim 1, wherein the said spatial light modulator devices are binary spatial light modulators.

4. The optical processing system according to claim 1, wherein the system comprises two or more modules, wherein at least one module comprises two or more input spatial light modulating devices and wherein at least one module comprises two or more filter spatial light modulating devices.

5. The optical processing system according to claim 4, wherein at least one of said modules comprises a beam splitting element configured to split the optical input into two orthogonal directions.

6. The optical processing system according to claim 1, wherein said input spatial light modulating device comprises input data and wherein said filter spatial light modulating device comprises filter data, the system further comprising means for shifting input or filter data across said input and filter spatial light modulator devices, respectively.

7. A method of processing an optical output received from the optical processing system according to claim 1, the method comprising the steps of:
identifying the position of a correlation peak of the optical output;
displacing optical input data across the input SLM to thereby obtain a shift in the correlation peak; and
identifying the input SLM corresponding to the correlation peak based on the location of the optical output and said shift.

8. A method of processing an optical output received from the optical processing system according to claim 1, wherein the optical output is split to be received by a plurality of cameras at different optical path distances, the method comprising the steps of:
identifying the position of a correlation peak of the optical output,
displacing optical input data across the input SLM to thereby obtain a shift in the images planes of the respective cameras;
displacing the plurality of cameras along the respective optical path to detect the optical output, and
identifying the input SLM corresponding to the correlation peak based on the location of the optical output.

9. A method of processing an optical output received from the optical processing system according to claim 1, the method comprising the steps of:
tilting a filter SLM to thereby obtain a corresponding shift of the correlation peak relative to the input SLM; and
identifying the filter SLM corresponding to the correlation peak based on the location of the optical output and said shift.

10. A method of processing an optical output received from the optical processing system according to claim 1, the method comprising the steps of:
translating filter data of the SLM before taking a fast Fourier transform to thereby obtain a corresponding shift of the correlation peak relative to the input SLM; and
identifying the filter SLM corresponding to the correlation peak based on the location of the optical output and said shift.

11. A method of processing an optical output received from the optical processing system according to claim 1, the method comprising the steps of:
applying a phase-ramp to a filter SLM to thereby obtain a corresponding shift of the correlation peak relative to the input SLM; and
identifying the filter SLM corresponding to the correlation peak based on the location of the optical output and said shift.

12. A co-processor comprising the optical processing system according to claim 1.

13. A method of identifying a sequence using the co-processor of claim claim 12.

14. A method of identifying a sequence using the optical processing system according to claim 1.

* * * * *